United States Patent [19]

Beltz et al.

[11] Patent Number: 5,006,981
[45] Date of Patent: Apr. 9, 1991

[54] SYSTEM BUS EXPANSION FOR COUPLING MULTIMASTER-CAPABLE MULTICOMPUTER SYSTEMS

[75] Inventors: Dietmar Beltz; Hans-Juergen Nehler; Werner Rozek, all of Jena, German Democratic Rep.

[73] Assignee: Jenoptik Jena GmbH, Jena, German Democratic Rep.

[21] Appl. No.: 268,818

[22] Filed: Nov. 8, 1988

[30] Foreign Application Priority Data

Dec. 11, 1987 [DD] German Democratic Rep. ... 310262

[51] Int. Cl.⁵ .................................................. G06F 7/00
[52] U.S. Cl. ..................... 364/200; 364/240.2; 364/239; 364/239.9; 364/228; 364/229; 364/230; 364/230.4; 364/240; 364/240.4; 364/242.6; 364/242.92
[58] Field of Search ... 364/200 MS File, 900 MS File

[56] References Cited

U.S. PATENT DOCUMENTS

| | | |
|---|---|---|
| 4,384,327 | 5/1983 | Conway et al. ........................ 364/200 |
| 4,390,967 | 6/1983 | Eglowstein et al. .................. 364/900 |
| 4,547,849 | 10/1985 | Louie et al. ........................ 364/200 |
| 4,639,861 | 1/1987 | Appiano et al. ...................... 364/200 |
| 4,682,285 | 7/1987 | Ozil et al. ............................ 364/200 |

Primary Examiner—Gareth D. Shaw
Assistant Examiner—Rebecca L. Rudolph
Attorney, Agent, or Firm—Jordan and Hamburg

[57] ABSTRACT

A system bus expansion which guarantees the coupling of multimaster-capable multicomputer systems and acts as an interface between spatially separated but mutually disposed system components. The expansion includes a separate expansion module, serving as a receiver and transmitter of addresses, data, commands, and status signals, assigned to each of the system buses that is to be coupled. These expansion modules are connected by a cable. The transmission is effected without changes, so that the two bus sides form a logical unit, and this unit, as well as each side by itself, remains multimaster-capable.

1 Claim, 3 Drawing Sheets

TABLE 1

| Lfd. Nr. | iMSTRx | iMSTRy | /e MWTC /e IOWC | /e MRDC; /e IORC /e INTA | eXACKy | /e OE 1 | /e OE 2 |
|---|---|---|---|---|---|---|---|
| 1 | H | L | H | H | L | H | L |
| 2 | H | L | L | H | X | H | L |
| 3 | H | L | H | L | L | H | H |
| 4 | H | L | H | L | H | L | H |
| 5 | L | H | H | H | L | L | H |
| 6 | L | H | L | H | X | L | H |
| 7 | L | H | H | L | X | H | L |

X ≙ ARBITRARY CONDITION
L ≙ LOW - LEVEL
M ≙ HIGH - LEVEL

SYSTEM BUS EXPANSION FOR COUPLING MULTIMASTER-CAPABLE MULTICOMPUTER SYSTEMS

FIELD OF THE INVENTION

This invention relates to a system bus coupling, usable in digital data processing, for multimaster-capable multicomputer systems. In particular, it acts as an interface between spatially separated but mutually disposed system components.

BACKGROUND OF THE INVENTION

For many fields of application, it is customary and necessary to link a computer with other computers or data stations.

As described, for example, in GDR-WP 208254, this can be achieved through a serial interface. However, this has the disadvantage of taking a great deal of time. Alternatively, the connection can be established through a bus coupling.

Couplings are known between master units on one side of the bus and either slave or master units on the other side. The known technical solutions attempt to expand limited bus systems through their bus parameters (such as bus load, limited bus arbitrage). Because further resources are thus coupled in, the power of the computer systems is increased in this way and/or a better matching of bus or computer systems to the individual technical or engineering application becomes possible. Thus GDR-WP 231672 discloses a technical solution, in which a bus receiver, which is plugged into the system bus of a master cassette and which contains units to establish the status and to activate an extension, is connected via a transmission cable to a bus driver which is plugged into the system bus of the slave cassette and which contains units for accepting the status, for synchronization, and for bus control. The transmission cable contains multiplex lines for data and addresses, interrupt lines, status lines, an extension-activation line, a data enable control line, and a bus access acknowledgment line.

A disadvantage of this technical solution is that it can only establish a coupling between the master cassette on one side and the slave cassette on the other side.

Moreover, a circuit arrangement for coupling system-external microprocessors to a given bus system is also known (GDR-WP 237923). Here, data are exchanged via a two-gate memory through control signals from an interface connected to the given bus system and through an interface connected to the system-external microprocessors. A single circuit delivers acknowledgment signals to the bus systems on request and a command signal to the two-gate memory. The acknowledgment signal for the given bus system serves as a polling signal for a decoder to create interrupts for a particular system-external microprocessor.

The intermediate storage of data is a disadvantage here. This delays data exchange as a whole and restricts the time available for data exchange. Another disadvantage is the effort needed in terms of software to link the coupling arrangement into the overall computer system.

Coupling solutions, where computer units are connected through peripheral processors (German Auslegeschrift 2,924,899), also have these disadvantages: additional interrupts here further impair the time balance.

All the technical solutions share the common disadvantage that either the master units of the system buses to be expanded do not have direct unhindered access to the resources of the units of the respectively remote bus sides or that only the master unit of one bus side can use the resources of the other bus side, but no master unit may be present on the other bus side.

SUMMARY OF THE INVENTION

It is an object of the invention to increase the power of multimaster-capable computer systems by using advantageous bus characteristics while guaranteeing short processing times.

The invention is directed to the provision of a system for coupling spatially separated multimaster-capable system buses, for which interrupts and bus arbitration have been provided and which effect bus transfers according to the master/slave handshake principle, into a multimaster-capable system bus which operates in a functionally uniform fashion, and for guaranteeing direct unhindered access of the master units of each bus side to the resources of the other respective bus side. This objective is accomplished by a system bus expansion for coupling multimaster-capable multicomputer systems, the spatially separated system buses of which have master access to the transfer of addresses, data, and commands to a slave by means of bus arbitration. Pursuant to the invention, an expansion module, which serves as a transmitting and receiving unit of addresses, data, commands and status signals, is assigned to each system bus. This expansion module is coupled through a transmission cable. A bus arbitrage block is provided for each expansion module and supplied cyclically by a bus generator block over bus side control lines characterizing each system bus, with a command control- and acknowledgment signal-block, from which signal lines go out to a data transfer block, and on the other hand a negated bus side control line, which is assigned to the expansion module and which characterizes the system bus, is connected to an address transfer block. Moreover, a block for transmitting status signals is provided and is connected both to the command control-and acknowledgment signal-block and to the bus arbitrage block.

In one transmission cycle, the bus arbitrage blocks of the two expansion modules determine from the bus request signals of the two system buses and their preset priority coupling the respective authorization signal for attaining the bus control of the associated master, each bus arbitrage block granting authorization for the system bus assigned to it. A bus side control signal is formed from the authorization signals of the entire system bus and from the knowledge of the position of the transmission sites of the bus request signals of the masters that are competing for the subsequent control. The direction of the address drivers present in the address transfer block is switched over the bus side control signal that is delivered by the respective bus arbitrage block. It is always switched in the direction of that side of the resulting uniform system bus that faces away from the master, no matter on what side the slave is located. Data drivers present in the data transfer block are switched in the same direction. For the transmission of command and acknowledgment signals, the system bus expansion takes on the role of a slave with respect to the master and the role of a master with respect to the slave. The direction of transmission is switched in the direction of the side that faces away from the master. Depending on the status of the data transfer block, the commands are either forwarded directly, or else forwarding is delayed.

If a read command or an interrupt acknowledgment signal is present, which is analyzed by the command control- and acknowledgment signal-block, the data transfer direction of the data transfer block on the side facing away from the master is switched in the opposite direction. At the same time, the data transfer block of the side facing towards the master is set inactive. During this switching process, forwarding of the read command is disabled, and after the switching has been completed, it is enabled again. The interrupt acknowledgment signals of the master are transferred without hindrance to the side that faces away from the master. Write commands are forwarded directly. If a write acknowledgment signal is involved, its forwarding to the side that faces the master is activated and implemented.

The command control- and acknowledgment signal-block of the side facing away from the master verifies the transmission of an acknowledgment signal through a slave situated on the side facing away from the master, this slave being addressed by means of an address transmitted by the master. A received acknowledgment signal is put into intermediate storage and is evaluated depending on the command transmitted by the master before it is forwarded to the side facing the master. When the acknowledgment signal for a read command or an interrupt acknowledgment signal is received, all data situated on the data bus facing away from the master, on arrival of the acknowledgment signal, is put into intermediate storage in the data transfer block of the side that faces away from the master, and the data transfer blocks of both sides are activated for data transport from the side facing away from the master to the side facing the master. After a static state has been established on the data line of the side facing the master, forwarding the acknowledgment signal to the side facing the master is activated and implemented. The command signals which are transferred from the side facing the master to the side facing away from the master, are set inactive for the side facing away from the master by the command control- and acknowledgment signal-block of the side facing away from the master. After the commands from the master have become inactive, the command control- and acknowledgment signal-block sets the acknowledgment signal on the side facing the master inactive, and the base state of the expansion module is established.

BRIEF FIGURE DESCRIPTION

The invention will be explained in more detail with reference to the accompanying drawings and with reference to the multimaster-capable IEEE 796 bus, which fulfills all essential functional and time-specific requirements of the AMS bus. In redrawings.

DETAILED DISCLOSURE OF THE INVENTION

Figures 1, 4:
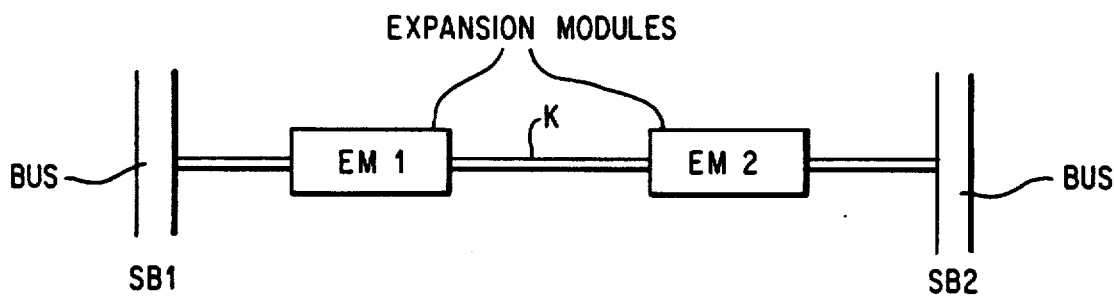
FIG. 1 shows the connection between two expanded system buses.
Figure 2:
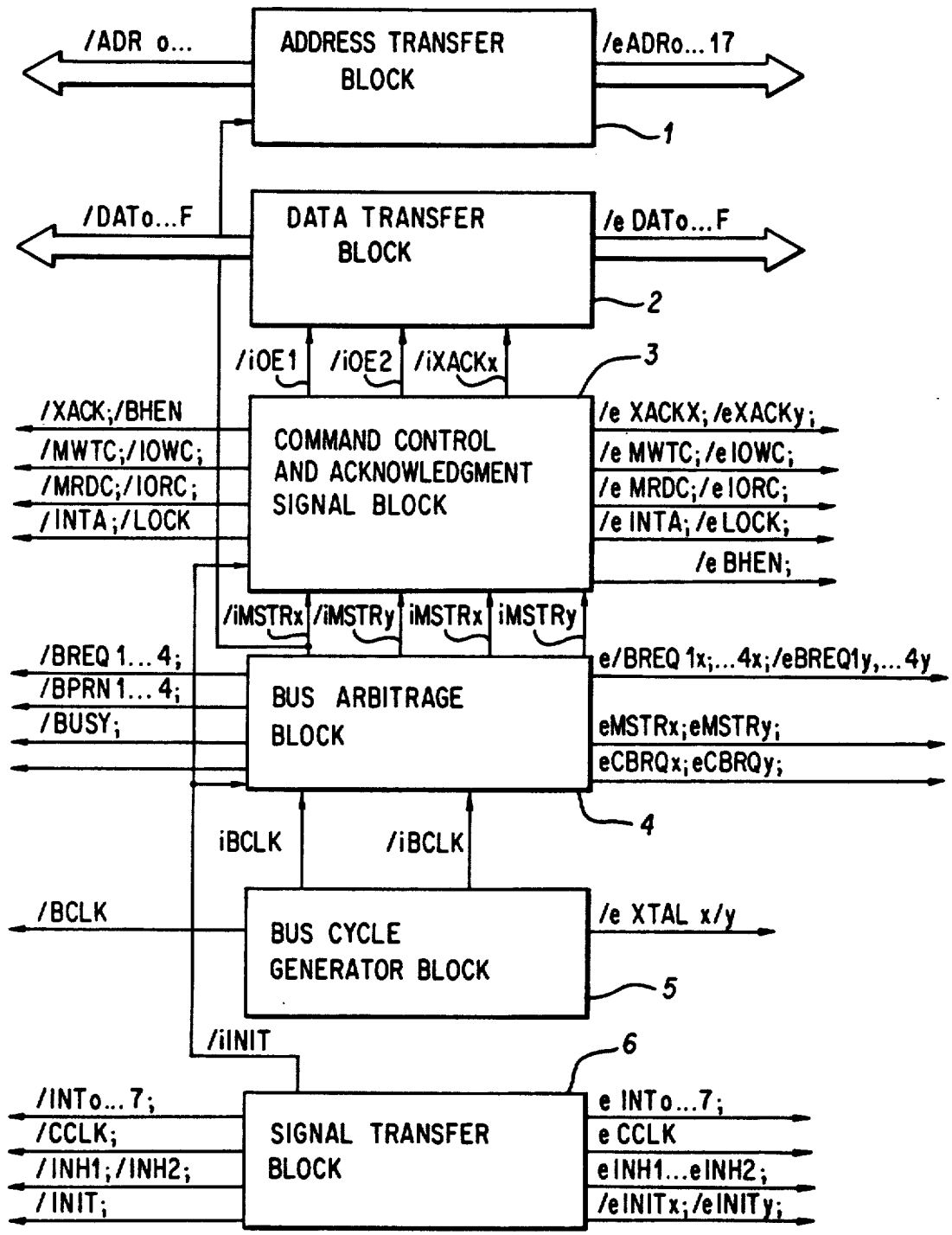
FIG. 2 shows a block circuit diagram of an expansion module, such as is assigned to each system bus.

Two expanded system buses SB1 and SB2 are connected as shown in FIG. 1, by an expansion with expansion modules EM1 and EM2, which are linked together by a cable K. Each of the expansion modules EM1, EM2 has the structure shown in FIG. 2.

An address transfer block 1 comprises tristate-capable, bi-directional drivers. On the one hand, these are connected to the address lines ADR0 ... 17 of the associated system bus and, on the other hand, they are connected to the address lines /eADR0 ... 17 of the transfer cable K. The directional inputs of address bus drivers situated in the address transfer block 1 are coupled to a bus arbitrage block 4 via a module-internal line of an inverse bus side control signal /iMSTRx. A data transfer block 2 contains in each case a first tristate-capable data driver pair and a second tristate-capable and latch-capable data driver pair. The tristate control inputs of the first data driver pair are connected to a signal line /iOE1. A signal line /iOE2 is connected to the tristate control inputs of the second latch-capable data driver pair. On the other hand, a module-internal line of a signal /iXACKx is connected to its latch control input. A command control- and acknowledgment signal-block 3 and the data transfer block 2 are connected through signal lines iOE1, /iOE2 and the line /iXACKx. The bus arbitrage block of the expansion module that is associated with the particular system bus is connected to the bus lines /BUSY, /CBRQ, /BREQ$_n$, /BPRN$_n$, n=1, ... 4 more, there is a connection via module-internal cycle lines /iBCLK and iBCLK to a bus cycle generator block 5, and via a /iINIT line to an initializing stage in a block 6 for transferring various signals. The bus arbitrage block 4 feeds the lines iMSTRx, /iMSTRx, iMSTRy, /iMSTRy as well as the lines eMSTRx, eCBRQx, and /eBREQ1x ... 4x, which go to the other expansion module. It also interrogates the input lines eBREQ1y ... 4y, eMSTRy, and eCBRQy, which are coupled to the other expansion module via the cable K.

The bus cycle generator block 5 comprises a bus cycle generator, which is coupled to a master cycle generator. The bus cycle generator is connected to a bus cycle line /BCLK, as well as to the bus arbitrage block 4. The output of the master cycle generator is connected to the bus cycle generator of the same expansion module via a signal delay unit, and is connected to the input of the other expansion module via the cable K, line /eXTACx/y.

The block 6 for transferring various signals is connected on the bus side to the bus signal lines /INH1, /INH2, /INT0 - /INT7, /CCLK, which are driven in the preset direction and are conducted to the other expansion module. The bus line /INIT is likewise connected to block 6. In block 6, an internal reservation of /iINIT and the independently recognized forwarding of the initializing signal taking place either from the bus line to the cable line /eINITx or from the /eINITy cable line to the bus line /INIT.

Figure 3:
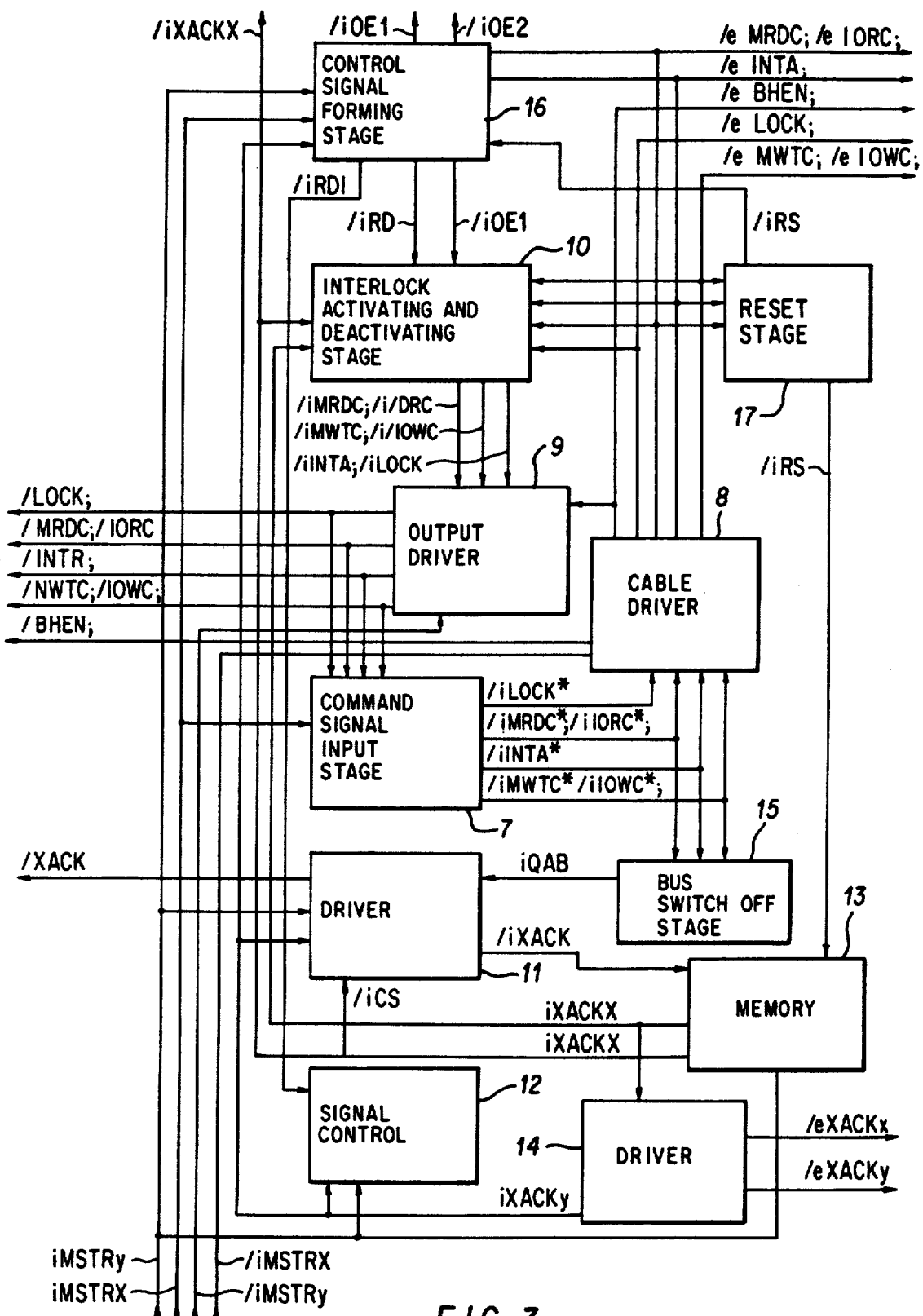
FIG. 3 shows a block circuit diagram of the command control- and acknowledgment signal-block.

As shown in FIG. 3, the command control- and acknowledgment signal-block 3 comprises:

A command-signal input stage 7

A tristate-capable cable driver 8 for the command signals

A tristate-capable bus output driver 9 for the command signals

A command-signal interlock deactivating and activating stage 10 for the command signals A tristate-capable acknowledgment-signal input and output driver 11 and an associated tristate signal control 12

An intermediate memory 13 for the acknowledgment signal /XACK

Input and output cable drivers 14 for the acknowledgment signal /eXACKy and /eXACKx A bus switch-off stage 15 for the acknowledgment signal A stage 16 for forming the tristate control signals /iOE1, /iOE2 for the data transfer block 2 with a /INTA signal intermediate memory and A reset stage 17 for the /INTA signal intermediate memory and for the intermediate memory 13.

The command signal input stage 7 is connected on its input side to the signal lines /MRDC, /IORC, /MWTC, /IOWC, /LOCK, and /INTA of the associated system bus. The signals /iMRDC*, /iIORC*, /iMWTC*, /iIOWC*, iLOCK*, and /iINTA* of this stage represent the respective result of the logical linkage with the signal iMSTRx. The logical functions are:

$$/iMRDC* = /MRDC \ / \ /iMSTRx$$

$$/iIORC* = /IORC \ / \ /iMSTRx$$

$$/iMWTC* = /MWTC \ / \ /iMSTRx$$

$$/iIOWC* = /IOWC \ / \ /iMSTRx$$

$$/iLOCK* = /LOCK \ / \ /iMSTRx$$

$$/iINTA* = /INTA \ / \ /iMSTRx$$

The signal lines /iMRDC*, /iMWTC*, /iIORC* and /iINTA* are connected to the cable driver 8 and to the bus switch-off stage 15. The signal line iLOCK* connects the command signal input stage 7 to the cable driver 8. The signal /BHEN leads directly to the cable driver 8. While the tristate input of the cable driver 8 is connected to the signal line IMSTRx, the outputs are connected to the bi-directional lines /eMRDC, eIORC, /eINTA, /eBHEN, /eLOCK, /eMWTC, and /eIOWC. These bi-directional lines are tapped at each expansion module EM1, EM2. Thus, the input of the reset stage 17 is connected to the lines /eMWTC, /eIOWC, eMRDC, /eIORC and /eINTA. The inputs of the command interlock deactivation and activation stage 10 are connected to the same lines as the reset stage 17. Further signal lines of stage 10 are the following:

a signal line for the acknowledgment signal iXACKx, which is in intermediate storage, as well as for its negated signal /iXACXx a signal line for a general read request /iRD a signal line /iOE1 of the tristate control signal of the data driver pair.

The outputs of the command interlock deactivation and activation stage 10 are connected to the signal lines /iMRDC, /iIOWC, /iMWTC, /iIOWC, iINTA, and /iLOCK which lead to the tristate-capable bus output driver 9. Further input variables of the bus output driver 9 are /eBHEN and the signal line of the negated bus side control signal /iMSTRy, which characterizes the control of a master of the other respective system bus. On the output side, the bus output driver 9 is connected to the bus lines /BHEN, /LOCK, /MRDC, /IORC, /INTA, /MWTC and /IOWC of the assigned system bus. The stage 16 for forming the tristate control signals for the data transfer block 2 is connected on its input side to the bi-directional lines /eMRDC, /eIORC and /eINTA, to the bus side control lines for the signals iMSTRx and iMSTRy, which are delivered by the bus arbitrage block 4, the signal line for iXACKy from the input cable driver 14 and the reset line /iRS for the /INTA intermediate memory. The signal iXACKy is the acknowledgment signal that is stored and delivered by the other respective expansion module. The outputs of stage 16 for forming the tristate control signals are coupled to the signal lines /iOE1, /iOE2, /iRDI, /iRD. While the signal line /iOE2 leads to the data transfer block, the signal line /iOE1 is connected on the one hand to the data transfer block 2 and, on the other, to the command interlock deactivation and activation stage 10. The line of the general read command (/iRD = /eMRDC ∧ /eIORC) likewise leads to stage 10. The line of the signal /iRDI with /iRDI = /iRD ∧ /eINTA is connected to the tristate signal control 12. The tristate-capable acknowledgment signal input and output driver 11 on the one hand is coupled to the system bus line /XACK of the assigned system bus and, on the other, is connected on the output side via the line /iXACK to the intermediate memory 13 for the acknowledgment signal and, on the input side, to the signal lines iMSTRx, iXACKy and the iQAB line, which comes from the bus switch-off stage 15. The tristate input of the acknowledgment signal input and output driver 11 is connected to the tristate signal control 12 via the line /iCS. In addition to the input line /iRDI, there is an iXACKy input line, which comes from the input and output cable driver 14 for acknowledgment signals, as well as the iMSTRy input line. The reset input of the intermediate memory 13 for the acknowledgment signal /iXACK is connected to the signal line /iRS.

The logical linkage of the input signals of stage 16 to form the tristate control signals for the data driver is specified in Table 1 in addition to the already described couplings for /iRDI and /iRD.

The command disable and enable signals are derived in the command interlock deactivation and activation stage 10, and they are forwarded according to the following equations:

$$/iMWTC = /eMWTC \ \lor \ \overline{/iXACKx \land /iOE1}$$

$$/iIOWC = /eIOWC \ \lor \ \overline{/iXACKx \land /iOE1}$$

$$/iMRDC = /eMRDC \ \lor \ (iXACKx \ \lor /iRD)$$

$$/iIORC = /eIORC \ \lor \ (iXACKx \ \lor /iRD)$$

$$/iINTA = /eINTA \ \lor \ iXACKx$$

The logical coupling takes place in the reset stage 17 according to the equation $$/iRS = /iINIT \land \overline{(/eMRDC \land /eIORIC \land /eMTC \land /eIOWC \land /eINTA)}$$

A logical linking takes place in the bus switch-off stage according to $$iQ_{AB} = \overline{(/iMWTC* \land /iMRDC* \land /iIOWC* \land /iIORC* \land /iINTA*)}$$

A linkage of (iQ$_{AB}$ ∧iXACKy) takes place in the input and output driver 11 before the signal is applied to the input of the acknowledgment signal input and output driver.

The logical linkages

/iCS=((/iRDI∧iXACKy) V iXACKy)) / iMSTRy take place in the tristate signal control 12.

The lines /eMRDC, /eIORC, /eMWTC, /eIOWC, /eINTA, /eBHEN, and /eLOCK of the expansion modules EM1 and EM2 are connected together over the cable K.

Before a transfer is executed over the coupling point formed by the mutually connected expansion modules EM1, EM2, the masters for a bus access give the bus request signals BREQ$_n$ with n = 1x, . . . , 4x, 1y, . . . , 4y to the bus arbitrage block 4 of each bus expansion module EM1, EM2. For this purpose, for example, the bus request signals from the system bus SB1 are conducted, on the one hand, to its bus arbitrage block 4 and, on the other, via the cable K, to the bus arbitrage block of the expansion module EM2 on the other hand. Corresponding to a priority coupling, which is implemented in each of the bus arbitrage blocks, the master with the highest priority receives authorization to attain bus control, which is communicated to the associated master via the system bus signal line /BPRN$_n$ with n = 1, . . . , 4. At the same time, the bus arbitrage block 4 issues only authorization for acquiring the bus control for the masters at the system bus SB1, and the other bus arbitrage block does this for the system bus SB2. The bus side control signal iMSTRx is generated from the signals /BPRN$_n$ of the entire system bus by means of the bus arbitrage block 4 for system bus SB1 and by means of the other bus arbitrage block for system bus SB2. This signal is conducted to the respective other expansion module via the cable K. With reference to the respective other expansion module, the signal iMSTRx represents the signal iMSTRy. The signal iMSTRx is switched into the appropriate state in each expansion module EM1, EM2 in connection with the inactive bus signal /BUSY and the cycle signal /iBCLK. With the switching over of the bus side control signals to the expansion modules EM1, EM2, the direction of the address driver is also switched over, so that the address drivers can forward the addresses from the master to the side facing away from the master. The data drivers are switched in accord with Table 1 so that, from the point of view of the master, the data drivers likewise are set in the direction of the write flow.

In the command control- and acknowledgment signal-block 3, the command signal input stage 7 is enabled (or disabled) depending on the signal iMSTRx, and the cable driver 8 is not in the tristate state (or is in the tristate state).

To more clearly explain the further mode of functioning assume that the master situated at the system bus SB1. The states in the expansion module EM1 are the following:

The command-signal input stage 7 is enabled, and the cable driver 8 is in the active state. The tristate-capable bus output driver 9 is in the tristate state. The states of these three stages do not change until the bus side control changes.

The acknowledgment signal driver is in the tristate state. The intermediate memory 13 has the inactive acknowledgment signal written on it, which is accomplished by the signal /iRS, through the reset stage 17, when the signals /eMRDC, /eIORC, /eMWTC, /eIOWC and /eINTA are inactive.

For this bus side control, the intermediate memory 13 remains in this state. The state of the command interlock deactivation and activation stage 10 is of no interest, since the tristate state of the bus output driver 9 prevents a feedback of the commands to the system bus SB1.

The following states exist on the system bus SB2:

The command-signal input stage 7 is disabled by the signal iMSTRx of the expansion module EM2. The cable driver 8 is in the tristate state. When the signal /iRS is active, the reset stage keeps the intermediate memory 13 in an inactive acknowledgment signal state. The acknowledgment signal input and output driver 11 is switched out of the tristate state and represents an input stage with reference to the system bus SB2. The bus output driver 9 is likewise taken out of the tristate state. The command interlock deactivation and activation stage 10 is enabled for /eINTA commands, but is disabled for write commands /eMWTC, eIOWC precisely when the data transfer block 2 has not yet stably switched over into the write direction. Otherwise, stage 10 is enabled for write commands. For read commands, /eMRDC, /eIORC, stage 10 is always disabled. The states of the command-signal input stage 7, of the cable driver 8, of the tristate input of the acknowledgment signal input driver 11, and of the tristate input of the bus output driver 9 persist for the set bus side control until the next bus side change. The states set represent the output state in this manner.

If, after an address output and Possibly a data output (in the case of write commands), the master places a command signal on the system bus SB1, this signal is transferred, via the input stage 7 and the cable driver 8 of the expansion module EM1, to the appropriate command line, which is connected via the cable K to the expansion module EM2. In the expansion module EM1, in stage 16 for forming the tristate control signals for the data driver, the commands are analyzed in terms of write, read, or /eINTA commands.

In the case of a write command, the tristate signals remain in the state according to Table 1. If the first /eINTA command of a /eINTA cycle is involved, it is put into intermediate storage in stage 16. From the /eINTA signal in intermediate storage, the tristate signal, which characterizes the write direction, is switched inactive, that is, the data transfer block 2 of the expansion module EM1 is in the tristate state on the system bus side and on the cable side.

If a read command is involved, the reaction which occurs with respect to the tristate signals of the data driver is the same as that which occurs in the case of the /eINTA command. In the expansion module EM2, in the stage for forming the tristate control signals for the data drivers, the commands are likewise analyzed, these processes taking place as in the expansion module EM1.

The reset stages of the two expansion modules EM1, EM2 are in the inactive state (/iRS is inactive).

If, in terms of addresses, no slave is addressed at the system bus SB2, the output state is set after the commands are removed.

If, in terms of addresses, a slave is addressed on the system bus SB2, it executes the command and places the acknowledgment signal on the system bus SB2. The input and output driver 11 receives the acknowledgment signal, forwards it to the intermediate memory 13 and, from there, via the acknowledgment signal output driver 11 to the expansion module EM1. The acknowledgment signal in intermediate storage disables the command interlock deactivation and activation stage 10, that is, the inactive state of the commands ties up the command-signal lines /iMRDC, iIORC, /iMWTC, /iIOWC and /iINTA. The slave can take away the acknowledgment signal.

In the case of a write command, the acknowledgment signal is taken over by the expansion module EM2, via the input cable driver of the expansion module EM1 and, after the tristate output of the acknowledgment signal driver 11 becomes active, forwarded without delay to the master. When the master withdraws the command, the expansion modules EM1, EM2 go into their output states.

If a /eINTA or read command is involved and the acknowledgment signal has become active, the data transmitted by the slave are put into intermediate storage in the latch-capable data drivers of the expansion module EM2. When the acknowledgment signal arrives at the expansion module EM1, the appropriate tristate signal is taken out of the inactive state in stage 16 to form the tristate control signals for the data drivers.

The acknowledgment signal likewise goes to the tristate signal control 12 for the acknowledgment signal driver 11. Here there is a delay in the activation of /iCS until the data drivers are stably switched in the data direction towards the master and the data have stably established themselves on the system bus SB1. When the signal /iCS becomes active, the execution sequence is the same as in the case of writing.

We claim:

1. A system bus expansion for coupling multimaster-capable multi-computer systems, said multi-computer systems having spatially separated system buses having master address, data and command lines with a uniform bus protocol for defining a master and slave via bus arbitration, said system bus expansion comprising an expansion module assigned to each system bus and means for sending and receiving addresses, data, commands and status signals, and a transfer cable for intercoupling the expansion modules, said expansion modules comprising:

(a) an address transfer block having bidirectional tristate drivers, the data inputs and outputs of the drivers being connected to addess lines of the assigned system bus as well as to address lines of the transfer cable, said drivers having directional inputs connected to receive a direction control signal /iMSTRX for controlling the direction of address signals with respect to the respective master, (b) a data transfer block having first and second tristate latchable data drivers, the inputs of said first data drivers being connected to data lines of the transfer cable and the outputs thereof being connected to data lines of the assigned system bus, the inputs of said second data drivers being connected data lines of the assigned system bus and the outputs of the second data drivers being connected to data lines of the transfer cable, said data transfer block comprising means responsive to a write command or an inactive bus command for transferring data without intermediate storage of the data in a direction away from the respective master system bus to the other master system bus, and, in the event of an active read command, to a slave at the other system bus, or in the event of an interrupt acknowledgement signal active for said slave, to effect the intermediate storage of the data from the addressed slave to at least one of the expansion modules and interrupt data transfer from the respective system bus to the other system bus in the event of an active read command for a slave at the respective system bus, or in the event of an interrupt acknowledgement signal active for the last mentioned slave, selection of the data transfer direction being effected by selection of the first or second data drivers, (c) a command control and acknowledgement signal block connected to the command lines of the respective system bus, and to command lines of the transfer cable, to the tristate control inputs of the first data drivers via a first signal line /iOE1, to the tristate inputs of the second data drivers via a second signal line /iOE2, and to the latch inputs of the second data drivers via a third signal line /ixACKx, said command control and acknowledge signal block comprising means for receiving a bus command signal sent within a bus cycle from a master to prepare for a change in the data transporting direction as a function of the bus command and to delay relaying the bus command to the other system bus independently of the bus command, means responsive to a write command for a slave at the other system bus for relaying the write command undelayed to such slave, and for receiving an acknowledgement signal sent from the slave and passing it on directly to the respective system bus, means responsive to a read command or an interrupt acknowledgement signal for a slave at the other system bus for relaying that command with delay to such slave, and responsive to the receipt of an acknowledgement signal from the addressed slave for changing the transport direction over determined signal lines /ieOE1 and /iOE2 in the data transfer block and effecting the intermediate storage of data in the latch data drivers and of the acknowledgement signal in at least one expansion module up to the conclusion of a transfer, and means responsive to the receipt of the acknowledgement signal for inactivating the active bus command on the other system bus, effecting the transfer of data, and, after adjustment to a static state on the respective system bus, sending the acknowledgement signal to the master, means responsive to a write command to a lave at the respective bus for retaining the data transporting direction, and means responsive to a read command or an interrupt acknowledgement signal for preparing to make a change in the transporting direction, and means responsive to an inactive bus command on the receptive system bus, for setting the data transporting direction to be from the respective system bus to the other system bus and canceling the intermediate storage of the acknowledgement signal, (d) a bus arbitrage block connected via bus request signal lines and bus permission signal lines to a master of the assigned system bus and, via the bus request signal lines of the transfer cable, each of which is in turn connected via the bus arbitrage block of the coupled expansion module with a bus request signal line, to masters of the other system bus, connections being provided for this purpose between the expansion module internal lines and the address transfer block and the command control and acknowledgement signal block, said bus arbitrage block being connected to a general bus request line /cBRQ of the assigned system buys and, via general bus request line eCBRQx and eCBRQy of the cable, to the bus arbitrage block of the coupled expansion module and which is connected to a "bus tied-up" signal line /BUSY of the respective system bus and via bus side domination lines eMSTRx and eMSTRy of the transfer cable and the arbitrage block of the coupled expansion module to a "bus tied up" signal line /BUSY of the coupled system bus, said bus arbitrage block comprising means for granting permission to attain bus domination through a master, in response to assigned priorities of the masters from which the bus request signals have been received, said priorities being preprogrammed, bus side domination signals and their negations being determined for each system bus and general bus requests of each system bus being transferred to the respective other bus as a function of the system bus clock signal, and a "bus tied up" signal is transferred from the respective system bus to the other system bus, (e) a bus clock signal generator block comprised of a bus clock signal generator and a master clock signal generator, the output of the master clock signal generator being connected to a bus clock signal line /BLCK of the respective system bus, as well as to the bus arbitrage block, the output of the master clock signal generator being connected via a signal delay unit to the input of the bus clock signal generator of the respective expansion module and via a line /eXTACKy of the transfer cable to the input of the bus clock signal generator of the other expansion module, and (f) a block for transferring signals connected to determined bus lines (/INH1, /INH1, /INRT0 . . . /INT7, /CCLK, /INIT) of the respective system bus and via cable lines to a corresponding block of the other expansion module, a signal being transferred, except on a given line /INIT in a preset direction, an active signal on the /INIT signal causing an inactivation of the bus domination signals, whereby the driver in the address transfer block, the data driver in the data transfer block and the command drivers in the common control and acknowledgement signal block are switched into their tristate condition.

* * * * *